United States Patent
Simoni

[19]

[11] Patent Number: 6,055,945
[45] Date of Patent: May 2, 2000

[54] FULL RANGE FEEDWATER CONTROL SYSTEM FOR PRESSURIZED WATER REACTOR STEAM GENERATORS

[75] Inventor: Leonard P. Simoni, Windsor, Conn.

[73] Assignee: Combustion Engineering, Inc., Windsor, Conn.

[21] Appl. No.: 09/210,714

[22] Filed: Dec. 14, 1998

[51] Int. Cl.$^7$ .................................................. F22D 5/26
[52] U.S. Cl. ........................................ 122/451 R; 376/211
[58] Field of Search ............................ 122/451 R, 451.1, 122/451.2; 376/210, 211

[56] References Cited

U.S. PATENT DOCUMENTS

| | | | |
|---|---|---|---|
| 4,777,009 | 10/1988 | Singh et al. | 376/211 |
| 4,912,732 | 3/1990 | Singh | 376/211 |

*Primary Examiner*—Denise L. Ferensic
*Assistant Examiner*—Jiping Lu
*Attorney, Agent, or Firm*—Ronald P. Kananen; Rader, Fishman & Grauer

[57] ABSTRACT

A feedwater control system for a pressurized water steam generating system, and a method for using such, includes a steam generator, at least one feedwater pump which receives an output signal from the feedwater control system, an economizer feedwater control valve which receives the output signal and automatically controls flow of feedwater to the steam generator when a power level of the feedwater control system is at a first predetermined range, preferably between about 10 and 100%, and a downcomer feedwater control valve which receives the output signal and automatically controls the flow of feedwater to the steam generator when the power level is at a second predetermined range, preferably between 0 and about 10%. A first input signal is provided, determined by the feedwater flow of the steam generator, along with a second input signal, determined by the steam flow of the steam generator, and a third input signal, determined by the level of the steam generator. The first, second, and third input signals are combined to determine the output signal at the first predetermined power level range, and the third input signal, by itself, determines the output signal at the second predetermined power level range. A switch automatically switches from the combined first, second, and third input signals, to just the third input signal, for determining the output signal, at a predetermined power level, i.e. at about 10% power.

14 Claims, 2 Drawing Sheets

FULL RANGE FEEDWATER CONTROL SYSTEM FOR PRESSURIZED WATER REACTOR STEAM GENERATORS

BACKGROUND OF THE INVENTION

The current System 80+ Feedwater Control System (FWCS) automatically controls the feedwater flow to the steam generators between 5% and 100% power. However, feedwater control below 5% power is a manual operation. The current FWCS uses input signals of steam flow rate, feedwater flow rate, and steam generator level to develop output signals that control the position of the feedwater valves and the speed of the feedwater pumps.

There is a large economizer feedwater valve, a small downcomer feedwater valve and a very small startup feedwater valve. The startup feedwater control valve is located in parallel with the downcomer feedwater valves. The large economizer feedwater valve is automatically controlled by the above three signals of the FWCS between 20% and 100% power. Also, the small downcomer feedwater valve is automatically controlled by only the steam generator level signal of the FWCS between 5% and 20% power. Furthermore, the very small startup feedwater valve is manually controlled by an operator when the power level is between 0% and 5%.

It is an object of the present invention to simplify the FWCS design, to make the system more reliable, and to reduce its capital operating cost, which previously had two automatically functioning systems, and one manually functioning system, according to the existing power levels. It is another object of the present invention to provide a more reliable feedwater system than is currently provided, especially with the System 80+ Feedwater Control System, by extending the operating range of the existing small downcomer valve and the larger economizer feedwater valve. It is another object of the invention to increase the automatic feedwater control operating range down to zero percent power, thereby relieving operators of monitoring and operating of the FWCS at operation power levels below 5%.

SUMMARY OF THE INVENTION

The above-described needs and others are met by a feedwater control system for a pressurized water steam generating system, which includes a steam generator, at least one feedwater pump which receives an output signal from the feedwater control system, an economizer feedwater control valve which receives the output signal and automatically controls flow of feedwater to the steam generator when a power level of the feedwater control system is at a first predetermined range, preferably between about 10 and 100%, and a downcomer feedwater control valve which receives the output signal and automatically controls the flow of feedwater to the steam generator when the power level is at a second predetermined range, preferably between 0 and about 10%. Each economizer feedwater control valve and downcomer feedwater control valve has a maximum valve turndown ratio of 50.

The feedwater control system also includes a first input signal, determined by the feedwater flow of the steam generator, a second input signal, determined by the steam flow of the steam generator, and a third input signal, determined by the steam generator level. The first, second, and third input signals are combined to determine the output signal at the first predetermined power level range, and the third input signal, by itself, determines the output signal at the second predetermined power level range.

An advantage of the feedwater control system of the present invention is its ability to automatically switch from the combined first, second, and third input signals, to just the third input signal, for determining the output signal at a predetermined power level, i.e. at about 10% power. Another advantage is that fewer valves are used.

The above described needs and others are also met by a method of controlling feedwater supply to a steam generator in a pressurized water reactor, which includes the steps of supplying an output signal from a feedwater control system to at least one feedwater pump, an economizer feedwater control valve, and a downcomer feedwater control valve, automatically controlling a flow of feedwater from the feedwater pump(s) to the steam generator when the power level of the feedwater control system is at a first predetermined range, preferably between about 10 and 100%, and automatically controlling a flow of feedwater from the downcomer feedwater control valve to the steam generator when the power level is at a second predetermined range, preferably between 0 and about 10%. In the method, each of the economizer feedwater control valve and the downcomer feedwater control valve has a maximum valve turndown ratio of 50.

The method further includes the steps of providing a first input signal, determined by the feedwater flow of the steam generator, providing a second input signal, determined by the steam flow of the steam generator, providing a third input signal, determined by the steam generator level, determining the output signal at the first predetermined power level range based on a combination of the first, second, and third input signals, and determining the output signal at the second predetermined power level range using only the third input signal.

The method further includes the step of automatically switching from the step of determining the output signal at the first predetermined power level range, based on a combination of the first, second, and third input signals, to the step of determining the output signal at the second predetermined power level range using only the third input signal.

DESCRIPTION OF THE PREFERRED EMBODIMENT

The above described needs are met by a system wherein automatic control of feedwater flow to pressurized water reactor (PWR) steam generators is enabled, over the full range of reactor power from 0 percent to 100 percent.

Figure 1:
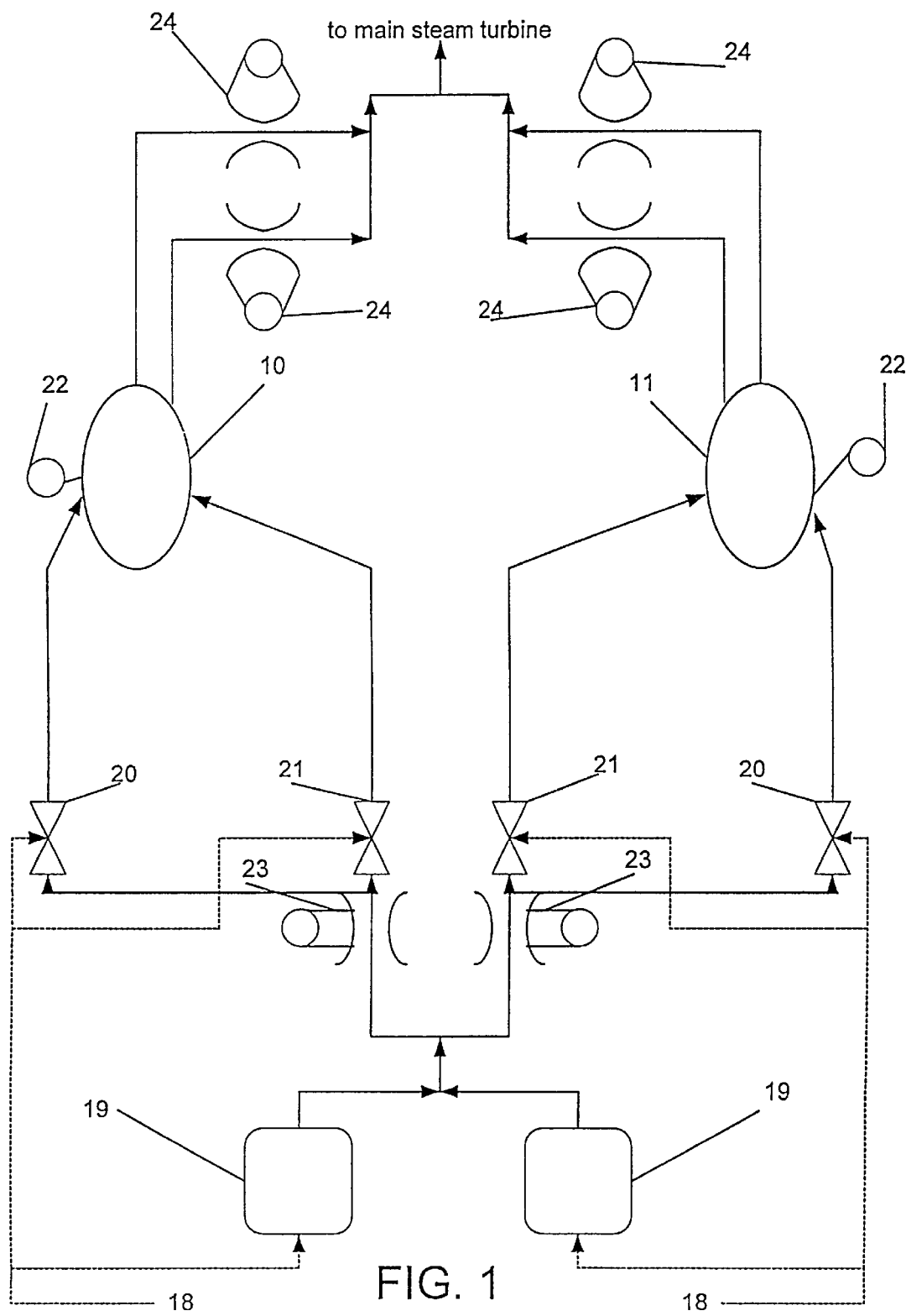
FIG. 1 shows a functional configuration for extended range automatic feedwater control, according to the principles of the present invention.
Figure 2:
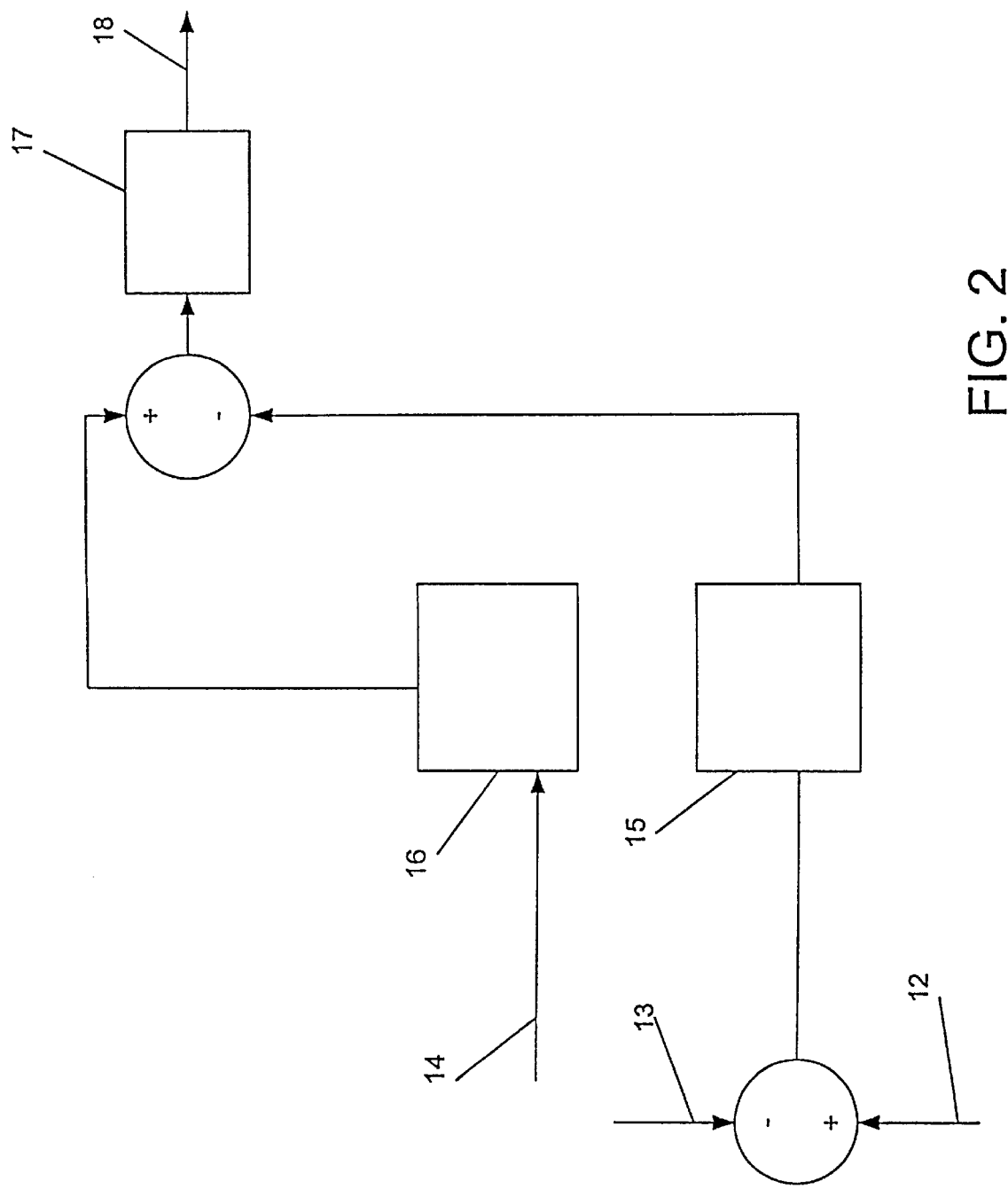
FIG. 2 shows a diagram of the electrical pathway of the feedwater control system according to the principles of the present invention.

Two substantially identical FWCS's, one for steam generator A 10 and one for steam generator B 11 in FIG. 1, are provided with a steam supply system such as an ABB Combustion Engineering Nuclear Power (ABB-CENP) nuclear steam supply system. The control logic of either FWCS is exemplified by FIG. 2.

The FWCS's control feedwater flow by processing signals from the transmitters and controlling the pumps and valves shown in FIG. 1. First, each FWCS receives input signals from various sources, the signals being numerically represented in FIG. 2. These signals convey data involving the steam generator feedwater flow 13, the steam generator steam flow 12, and the steam generator level 14. The steam generator level signal 14 is provided from a level transmitter 22 and processed in a signal processing unit 16. The feedwater flow signal is provided from a total feedwater flow transmitter 23. The steam generator steam flow signal 12 is provided from a steam flow transmitters 24. The feedwater flow signal 13 and steam flow signal 12 are coupled and processed in a signal processing unit 15. When the reactor power is greater than ten percent, the coupled feedwater flow and steam flow signals 12, 13 are combined with the steam generator level signal.

Upon receiving and processing these signals, a controller 17 generates an output flow demand (FD) signal 18. The FD signal 18 is processed into output signals that are respectively received by the feedwater pumps 19, the economizer feedwater control valves 20, and the downcomer feedwater control valves 21.

Each FWCS can be placed in automatic mode when the feedwater pumps are running, and the control valves can control feedwater flow such that stable SG water level is maintained. However, for existing FWCS's, such as the ABB-CENP FWCS, reactor power and steam load must be approximately 5% or greater, typically 15 to 20%, to establish these conditions.

In order to provide automatic control of SG water level when the reactor power and steam load are below 5%, the startup feedwater control valves existing in previous generators are eliminated. In their place, the downcomer feedwater control valves are automatically controlled, based on the SG water level, from 0% power to about 10% power.

At 0% power, defined to be hot zero power condition, all four of the main feedwater reactor coolant pumps 19 (only one is shown for each steam generator) are operating. The reactor coolant pumps produce 17 MWt of pump heat (i.e., 0.4% of full power). Full power operation corresponds to 3931 MWt.

Assuming a nominal pressure drop of 40 psi across the feedwater flow control valves, and using the feedwater flowrate required at hot zero power conditions, to remove 17 MWt of pump heat, the required valve flow coefficient ($C_v$) is easily calculated, using standard engineering methods, to be 8.2 per steam generator. The full power downcomer feedwater control valve 21 requirement, to pass 10% of the full power flowrate, using the same fluid conditions, would require a $C_v$ of 305. This would result in a downcomer valve turndown ratio of 305/8.2=37. The valve turndown ratio is standard engineering terminology and is defined as the $C_v$ at the maximum flow condition divided by the $C_v$ at the minimum flow condition. Valve turndown ratios of up to 50 are currently available for feedwater flow control. Therefore the downcomer valve turndown ratio of 37 is reasonable.

The flow range requirements for the economizer valve is set by the economizer valve opening at 10% power and the full power flowrate condition. The System 80+ full power $C_v$ requirement is approximately 2750, using the same engineering methods described above, and the 10% power would be 194. This would result in a turndown ratio of 14, which is very reasonable. The additional turndown margin allows for valve overlap at the 10% power point where the economizer valve would be opening and the downcomer valve remains open. At the 10% power transition point, the downcomer valve is automatically partially closed to allow the economizer valve to pass a majority of the required feedwater flowrate at this power level.

The manually operated, startup feedwater valves that are eliminated according to the principles of the present invention, have been used to provide the capability to fill the steam generators when the automatic FWCS is not available during cold shutdown. However, the new downcomer valve, according to the present invention, is able to fill the steam generators at a rate of approximately 300 gpm per steam generator. This rate is reasonable for filling the steam generators. Such a rate would require approximately three hours to fill each steam generator. Hence, the operational capacity to fill the steam generators, during cold shutdown conditions, is not lost with the present invention.

Accordingly, the present invention includes the elimination of the small, manual startup feedwater valve by extending the operating range of the existing downcomer valve and the economizer feedwater valves in the current System 80+ design. Simultaneously, the present invention includes automation of the steam generator feedwater control from 0 to 100% power. Hence, this improvement simplifies the FWCS design, provides a more reliable system, and increases the automatic feedwater control operating range while reducing the capital cost of the FWCS.

Having described an embodiment of the invention, it is to be understood that the invention is not limited to any of the precise embodiments described herein. Various changes and modifications could be effected by one skilled in the art without departing from the spirit or scope of the invention as defined in the appended claims.

What is claimed is:

1. A feedwater control system for a pressurized water steam generating system, which comprises:

a steam generator;

at least one feedwater pump, receiving an output signal from said feedwater control system;

an economizer feedwater control valve, receiving said output signal, and automatically controlling flow of feedwater to said steam generator when a power level of said feedwater control system is at a first predetermined range; and a downcomer feedwater control valve, receiving said output signal, and automatically controlling said flow of feedwater to said steam generator when said power level is at a second predetermined range.

2. A feedwater control system as set forth in claim 1, wherein each of said economizer feedwater control valve and said downcomer feedwater control valve has a maximum valve turndown ratio of 50.

3. A feedwater control system as set forth in claim 1, wherein said first predetermined power level range is between about 10 and 100%, and said second predetermined power level range is between 0 and about 10%.

4. A feedwater control valve system as set forth in claim 1, further comprising:

a first input signal, determined by a feedwater flow of said steam generator;

a second input signal, determined by a steam flow of said steam generator; and a third input signal, determined by a level of said steam generator, wherein said first, second, and third input signals, are combined to determine said output signal at said first predetermined power level range, and wherein only said third input signal determines said output signal at said second predetermined power level range.

5. A feedwater control system as set forth in claim 4, wherein said first predetermined power level range is between about 10 and 100%, and said second predetermined power level range is between 0 and about 10%.

6. A feedwater control system as set forth in claim 4, further comprising means for switching from a condition of said combined first, second, and third input signals, to a condition of only said third input signal, for determining said output signal.

7. A feedwater control system as set forth in claim 1, wherein said downcomer feedwater control valve is able to fill said steam generator at a rate of approximately 300 gallons per minute.

8. A method of controlling feedwater supply to a steam generator in a pressurized water reactor, which comprises:

supplying an output signal from a feedwater control system to at least one feedwater pump, an economizer feedwater control valve, and a downcomer feedwater control valve, automatically controlling a flow of feedwater from said economizer feedwater control valve to said steam generator when a power level of said feedwater control system is at a first predetermined range; and automatically controlling a flow of feedwater from said downcomer feedwater control valve to said steam generator when said power level is at a second predetermined range.

9. A method of controlling feedwater supply as set forth in claim 8, wherein each of said economizer feedwater control valve and said downcomer feedwater control valve has a maximum valve turndown ratio of 50.

10. A method of controlling feedwater supply as set forth in claim 8, wherein said first predetermined power level range is between about 10 and 100%, and said second predetermined power level range is between 0 and about 10%.

11. A method of controlling feedwater supply as set forth in claim 8, further comprising:

providing a first input signal, determined by a feedwater flow of said steam generator;

providing a second input signal, determined by a steam flow of said steam generator;

providing a third input signal, determined by a level of said steam generator;

determining said output signal at said first predetermined power level range based on a combination of said first, second, and third input signals; and determining said output signal at said second predetermined power level range using only said third input signal.

12. A method of controlling feedwater supply as set forth in claim 11, wherein said first predetermined power level range is between about 10 and 100%, and said second predetermined power level range is between 0 and about 10%.

13. A method of controlling feedwater supply as set forth in claim 11, further comprising automatically switching from said determining said output signal at said first predetermined power level range based on a combination of said first, second, and third input signals, to said determining said output signal at said second predetermined power level range using only said third input signal.

14. A method of controlling feedwater supply as set forth in claim 11, wherein said downcomer feedwater control valve is able to fill said steam generator at a rate of approximately 300 gallons per minute.

* * * * *